Patented Nov. 11, 1947

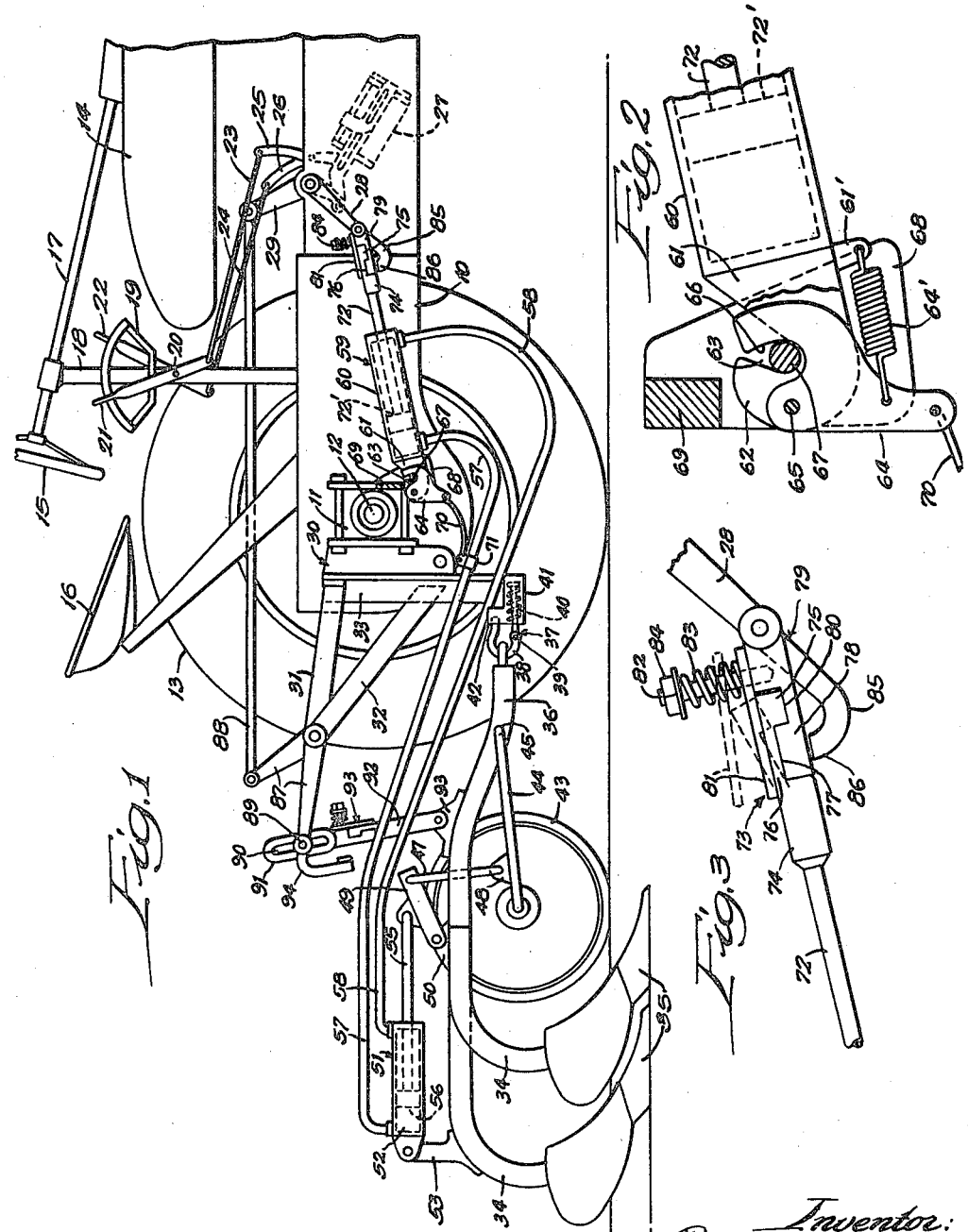

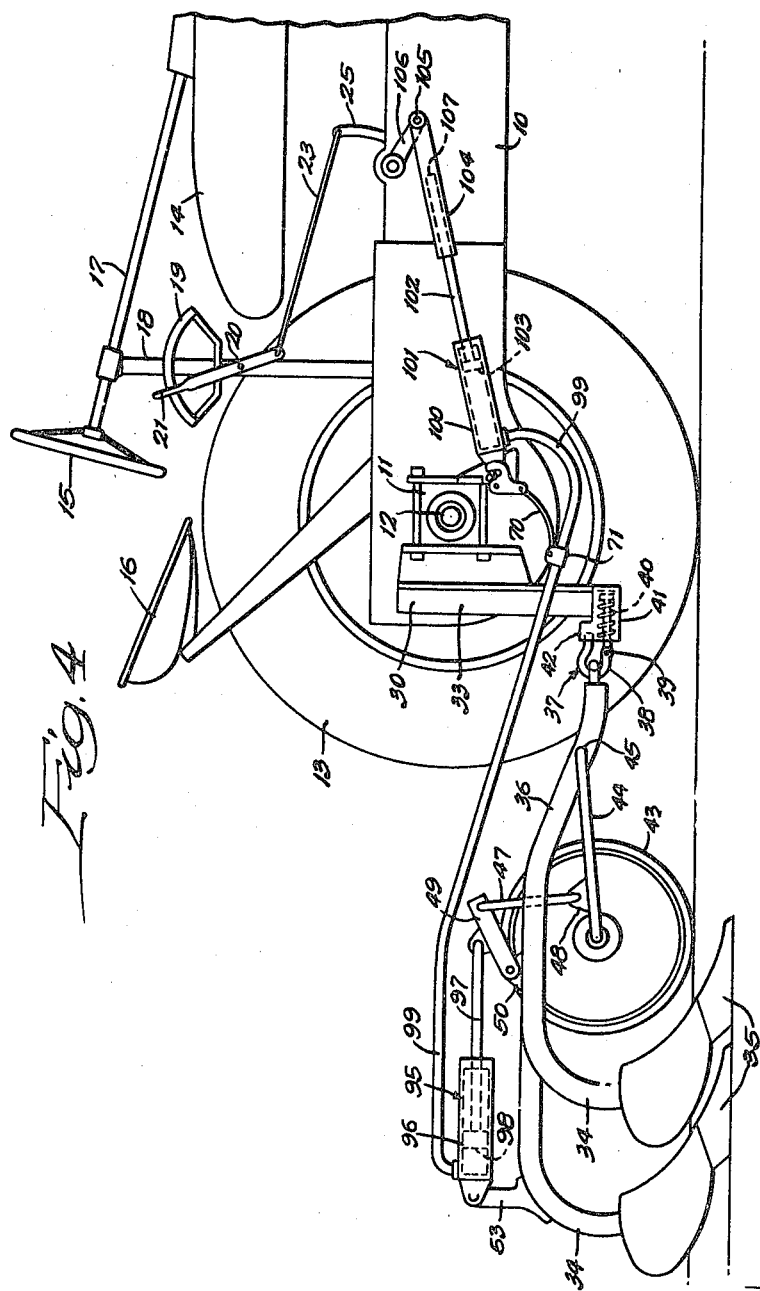

2,430,696

UNITED STATES PATENT OFFICE 2,430,696

POWER LIFT DEVICE FOR TRACTORS

Russel D. Acton, Chicago, Ill., assignor to International Harvester Company, a corporation of New Jersey Application August 7, 1944, Serial No. 548,473

18 Claims. (Cl. 97—50)

This invention relates to tractor-attached implements. More specifically, it relates to adjusting means particularly adapted to disconnectable tractor-attached implements. Power lift mechanisms are now widely used for controlling implements directly carried on tractors or attached thereto in trailing relationship. Tractors now being marketed are quite generally provided with built-in power lift mechanisms which incorporate a lifting arm or arms located on the tractor at the most convenient points for connecting lift actuating members. When using flexibly connected implements, it is necessary to transmit power from the power lift arm or arms to the implement. This requires flexible connections which will not be affected by movement of the implement relative to the tractor. The copending application Serial No. 528,672, filed March 22, 1944, issued as U. S. Patent No. 2,410,918 on November 12, 1946, discloses and claims a hydraulic power transmitting mechanism used in conjunction with a tractor power lift to provide a remote control for a flexilby connected implement. The present invention has to do with the application of such a power transmitting mechanism and its connections with a tractor.

The principal object of the present invention is to provide a hydraulic power transmitting mechanism for implements flexibly connected to tractors with automatic means for disconnecting from the tractor upon bodily movement of the implement relative to the tractor. Another principal object is to provide an automatic release means in a mechanical lifting connection between an implement and a tractor power lift device. Another object is to provide power lift connections for both lifting an implement relative to a tractor and for adjusting means on the implement, all said connections being automatically releasable upon fore and aft movement of the tractor relative to the implement. These objects and others which will be apparent from the description to follow are accomplished by constructions such as shown in the drawings, in which:

Figure 1 shows the rear portion of a tractor having an implement flexibly connected thereto, one wheel being removed to better show the attaching and lifting structure;

Figure 2 is an enlarged detail view of the quick release mechanism between the power actuating cylinder and the tractor;

Figure 3 is an enlarged detail view showing the connection between the hydraulic cylinder structure and the tractor power lift arm; and Figure 4 is a view similar to Figure 1 showing a modification in which a one-way cylinder is used on a trail-behind implement.

In Figure 1 a conventional farm tractor has been illustrated. Said tractor has a narrow body portion 10, an extended rear axle structure 11, drive axles 12, traction wheels 13, a gasoline tank and hood structure 14, a steering wheel 15, and an operator's seat 16. The steering wheel 15 is on a steering column 17 which is supported at its rear end by a vertical standard 18. Said standard also carries a quadrant 19 and provides means for pivotally supporting at 20 manually operable power lift control levers 21 and 22 which operate over the quadrant 19. Said levers are connected respectively by rods 23 and 24 with actuating members 25 and 26. One of the hydraulic operating cylinders 27 controlled by the actuating members 25 and 26 is indicated in dotted lines. It is to be understood that there are two of these cylinders, and that they are independently connected to the downwardly extending power lift arm 28 and the upwardly extending power lift arm 29.

A bracket structure 30 is secured by suitable means to the axle housing 11 at one side of the tractor. Said bracket structure includes a rearwardly extending member 31 and a downwardly extending brace member 32, also a vertically extending member 33 which serves in the construction illustrated as a draw-bar.

The implement illustrated is a plow having a pair of beams 34, each carrying a moldboard plow structure 35. In Figure 1, the plow is illustrated in working position with the plows operating a desired distance above the surface of the soil. The plow beams 34 are connected by a draw-bar structure 36 to an overload release structure 37. Said structure may be of any conventional design. As illustrated, it includes a clevis 38 pivotally connected to a pin 39 resiliently held by a spring 40 in a gauge structure 41. The upper part of the clevis fits under a bracket 42 from which it is releasable when a load is imposed on the mechanism greater than the resistance of the spring 40.

A gauge wheel 43 is rotatably mounted on the rear end of a link 44. Said link is pivoted on a transverse axis at 45 on the draft structure 36. A link 47 connected to a bracket 48 on the link 44 is pivotally connected to a lever 49 mounted for oscillation on a bracket 50 extending upwardly from one of the beams 34. An extensible chamber hydraulic device 51 of the piston and cylinder type is mounted on the implement. A cylinder 52 is pivotally connected to an upstanding bracket 53 secured to the rear plow beam 34. A piston rod 55 pivotally connected to the lever 44 carries a piston 56 mounted in the cylinder 52. The hydraulic device illustrated is of the two-way acting type, a conduit 57 being connected at one side of the piston and a conduit 58 being connected at the other side of the piston, said connections being at the ends of the cylinder. On the tractor a second expansible chamber hydraulic device 59 is mounted for supplying power to the device 51. The conduits 57 and 58 are connected to the opposite ends of a cylinder 60. Said cylinder is provided, as best shown in Figure 2, at one end with a connecting member 61 which has spaced end portions 62. Slots 63 extending into said end portions form sockets and provide hooks for a purpose to be hereinafter described.

A latch member 64 pivoted by a pin 65 between the hook portion 62 is formed with a slot 66 which overlaps the slots 63 for engaging a pin 67. Said pin is rigidly carried by spaced flanges 68 extending downwardly and forwardly from a plate member 69 secured to the axle structure, as shown in Figure 1. It will be noted that one of the flanges 68 is removed in Figures 1 and 2 to better show the latch structure. A downwardly depending portion of the latch member 64 is connected by a flexible element 70 with a clamping member 71 secured to one of the conduits between the two hydraulic devices. This specific structure is disclosed in the Mott Patent 2,252,349, August 12, 1941, and is not a part of the present invention.

A piston rod 72 carrying a piston 72' within the cylinder 60 extends forwardly where it is connected by a releasable structure indicated in its entirety by the reference character 73 with the lifting arm 28. The releasable structure includes a head portion 74 provided with an end 75 connected by a portion 76 of reduced width to the main body of the head portion. This reduced width is formed by a slot 77 in which an end portion 78 of a connecting member 79 is fitted. Said connecting member is provided with a slot 80 into which the end 75 fits. This construction provides a means for the transmission of force in either direction axially of the piston rod 72. To maintain the parts in position for the transmission of forces, a plate 81 overlies the member 77 and a part of the head portion 74 of the piston rod 72. A stud 82 threaded into the member 79 is surrounded by a spring 83 abutting the plate 81 and held in position by a nut 84 on the stud 82.

The lifting arm 28 has a rigid extension 85 provided with an upwardly curved end portion 86 lying closely adjacent the head portion 78 of the member 79. The dotted lines in Figure 2 indicate how the connection of the piston rod 72 is broken when it is moved to the angle indicated by release of the tractor connection at the other end of the cylinder.

A bell-crank lifting member 87 pivoted on the bracket structure 30 is connected by a lifting link 88 with the lifting arm 29. A pin 89 extending through the end of one leg of the bell-crank member 87 slidably extends through a slot 90 formed in a lifting member 91. Said member is connected to a second lifting member 92 by a releasable structure 93 identical with the releasable structure 73 previously described. The lifting member 92 is pivotally connected to a bracket 93 on the draft structure 36 of the implement. A rigid extension 94 on the bell-crank member 87 extends downwardly to the rear of the lifting member 91. Said extension is positioned to abut the member 91 when the draft structure of the implement is disconnected from the tractor allowing forward movement of the tractor with respect to the implement. The release structure 93 is then disconnected in the same manner as the release structure 73 as indicated in Figure 3.

When an implement of the type shown in Figures 1, 2, and 3 is attached with the structure as described, the gauge wheel 43 may be adjusted during travel of the tractor and implement by merely moving the manually controlled adjusting member 21. Power is then transmitted to the lifting arm 28 and through the hydraulic power transmitting mechanism to the linkage which regulates the position of the gauge wheel with respect to the remainder of the implement. Due to the two-way construction of the piston and cylinder devices, positive power is transmitted in both directions. This is a particularly desired feature with some types of implements where gravity cannot be relied upon and where it is therefore necessary to provide for application of force in two opposite directions. The hydraulic device on the tractor is so constructed that positive force may be applied in either direction thereon by the power lift arm 28. This two-way power application presents a particular problem when it is desired to have the hydraulic device automatically detachable from the tractor without injury to the connections when the implement is detached from the tractor either intentionally or by accidental means. When the overload release mechanism 37 is broken, the tractor moves forwardly whereby the conduit 57 through the connection 70 pulls the release member 64 downwardly from its engagement with the pin 67. A spring 64' is indicated as being connected to the latch member 64 and to a bracket 61' on the member 61. Said spring holds the latch member in position during normal operation due to the particular location of the notches in the latch member and in the member 61 with respect to the pivot pin 65.

When the latch 64 is released, the hydraulic device 59 drops downwardly thereby breaking the forward connection of the piston rod 72 as indicated by the dotted lines in Figure 3. This movement, therefore, simultaneously releases the forward end of the hydraulic device and frees it from the tractor.

As in the construction illustrated, there is also another connection between the tractor and the implement in the form of the mechanical lifting linkage. It is necessary to provide a break in said linkage. This is provided by the automatic release structure 93 which breaks when the tractor moves forwardly relative to the implement.

Figure 4 shows a modification in which only a single power lift is provided on the tractor and in which the implement is a true trail-behind implement, there being no connections between the implement and the tractor except at the connecting point of the draft structure 36 with the overload release structure 37. The tractor and implement parts which are in common to the structure shown in Figures 1 and 4 bear the same reference characters. An expansible chamber hydraulic device 95 of the single acting type has a cylinder 96 pivotally connected with the bracket 53. A piston rod 97, which carries a piston 98 in the cylinder 96, is pivotally connected to the lever 49. A flexible conduit 99 connected to one end of the cylinder 96 extends forwardly and is connected to one end of a cylinder 100, which is one element of a fluid-pressure hydraulic device 101 mounted on the tractor. Said hydraulic device is connected to the rear axle housing of the tractor by the same structure as the modification shown in Figure 1, the same reference characters identifying corresponding parts.

A piston rod 102 connected to a piston 103 in the cylinder 100 slidably extends into a pipe 104, which is pivotally connected at 105 to a lifting arm 106 corresponding to the lifting arm 28 in Figure 1, being however disposed at a different angle. The piston rod 102 abuts a stop 107 within the pipe 104 whereby power applied through the lifting arm 106 compresses fluid within the cylinder 100 and delivers fluid under pressure through the conduit 99 to the cylinder 96. Said fluid acting on the piston 98 moves the gauge wheel 43 downwardly thereby lifting the plows 35.

When the release mechanism 35 is disengaged by an overload or intentionally disengaged and the tractor moves forwardly with respect to the implement, the latch 64 is disengaged permitting the hydraulic device 101 to fall downwardly away from the tractor. The piston rod 102 slides from the pipe 104 thereby completely disengaging the device from the tractor. No injury can therefore come to the hydraulic device on the tractor or the neighboring one on the implement, whenever there is relative movement of the tractor relative to the implement, when disconnecting one or the other of the hydraulic devices.

The showings of applicant's improved release means for hydraulic adjusting devices are somewhat diagrammatic as the invention is better illustrated by such showings. It is to be understood that all modifications falling within the scope of the appended claims are contemplated as parts of the invention.

What I claim is:

1. A tractor attached implement comprising, in combination with a tractor having an operator-controlled power shiftable element, an implement structure secured to the tractor, a working member on said implement structure adapted to be adjusted with respect thereto, an expansible hydraulic device connected to the said member and the implement structure, a second expansible hydraulic device connected to the tractor and to said shiftable element, a flexible fluid pressure transmitting conduit connecting said hydraulic devices, and means for releasably connecting the hydraulic device on the tractor to the tractor and to the shiftable element, said means being operable by movement of the tractor relative to the implement structure to free the hydraulic device from the tractor.

2. A tractor attached implement comprising, in combination with a tractor having an operator-controlled power shiftable element, an implement structure secured to the tractor by an overload release mechanism, a working member on said implement structure adapted to be adjusted with respect thereto, an expansible hydraulic device connected to the said member, a second expansible hydraulic device mounted on the tractor and connected to said shiftable element, a flexible fluid pressure transmitting conduit connecting said hydraulic devices, and means for releasably connecting the hydraulic device on the tractor to the tractor and to the shiftable element, said means being operable by movement of the tractor relative to the implement structure to free the hydraulic device from the tractor.

3. A tractor attached implement comprising, in combination with a tractor having a draw-bar structure and an operator-controlled power shiftable element, an implement structure secured to said draw-bar structure by an overload release hitch mechanism, an implement member on said implement structure adapted to be adjusted for controlling its functioning, a two-way hydraulic device mounted on the implement and connected to said member, a two-way hydraulic device mounted on the tractor and connected to said shiftable element, a pair of flexible fluid pressure transmitting conduits connecting said hydraulic devices, and means for releasably connecting the hydraulic device on the tractor to the tractor and to the shiftable element, said means being operable after release of the hitch mechanism and subsequent movement of the implement structure relative to the tractor to free the hydraulic device from the tractor.

4. A tractor attached implement comprising, in combination with a tractor having a draw-bar structure and a manually controlled swingable lift member, an implement structure releasably secured to the draw-bar structure, a member on said implement structure adapted to be adjusted with respect thereto, a hydraulic device including a cylinder member and a piston member, one of said members being connected to the working member and the other member being connected to the implement structure, whereby reciprocation of the piston in the cylinder adjusts the position of the working member, a second hydraulic device including a cylinder member and a piston member, a releasable connection between one of said members and the power lift element, a second releasable connection between the other member and the tractor, a fluid conduit connecting the two cylinders whereby movement of one piston transmits movement to the other piston, and means connected to one of the releasable connections of the second hydraulic device operable to disconnect said release means upon release of the hitch mechanism and subsequent relative movement of the tractor with respect to the implement structure.

5. A tractor attached implement comprising, in combination with a tractor having a draw-bar structure and a manually controlled swingable lift member, an implement structure releasably secured to the draw-bar structure, a member on said implement structure adapted to be adjusted with respect thereto, a hydraulic device including a cylinder member and a piston member, one of said members being connected to the working member and the other member being connected to the implement structure, whereby reciprocation of the piston in the cylinder adjusts the position of the working member, a second hydraulic device including a cylinder member and a piston member, a releasable connection between one of said members and the power lift element, a second releasable connection between the other member and the tractor, said cylinder and piston devices being of the two-way acting type, fluid conduits connecting the two cylinders on opposite sides of the pistons, whereby movement of one piston transmits movement to the other piston, and means connected to one of the releasable connections of the second hydraulic device operable to disconnect said release means upon release of the hitch mechanism and subsequent relative movement of the tractor with respect to the implement structure.

6. A tractor attached implement comprising, in combination with a tractor having a draw-bar structure and a manually controlled swingable power lift member, an implement structure, an overload release hitch mechanism securing said structure to the draw-bar structure, a member on said implement structure adapted to be adjusted with respect thereto, a hydraulic device including a cylinder member and a piston member, one of said members being connected to the working member and the other member being connected to the implement structure, whereby reciprocation of the piston in the cylinder adjusts the position of the working member, a second hydraulic device including a cylinder member and a piston member, a releasable connection between one of said members and the power lift element, a second releasable connection between the other member and the tractor, said cylinder and piston devices being of the two-way acting type, fluid conduits connecting the two cylinders on opposite sides of the pistons, whereby movement of one piston in either direction transmits movement to the other piston, and means connected to one of the releasable connections of the second hydraulic device operable to disconnect said release means upon release of the hitch mechanism and subsequent relative movement of the tractor with respect to the implement structure.

7. A tractor attached implement comprising, in combination with a tractor having a draw-bar structure and a manually controlled swingable power lift arm, an implement structure, an overload release hitch mechanism securing said structure to the draw-bar structure, a soil working element on said implement structure, a depth gauge element connected to the implement adapted to be adjusted with respect thereto, a hydraulic device including a cylinder member and a piston member, one of said members being connected to the gauge element and the other member being connected to the implement structure, whereby reciprocation of the piston in the cylinder adjusts the working depth of the soil working element, a second hydraulic device including a cylinder member and a piston member, a releasable connection between one of said members and the power lift element, a second releasable connection between the other member and the tractor, a fluid conduit connecting the two cylinders whereby movement of one piston transmits movement to the other piston, and means connected to one of the releasable connections of the second hydraulic device operable to disconnect said release means upon release of the hitch mechanism with subsequent relative movement of the tractor with respect to the implement structure.

8. A tractor attached implement comprising, in combination with a tractor having a draw-bar structure and a manually controlled swingable power lift arm, an implement structure, an overload release hitch mechanism securing said structure to the draw-bar structure, a soil working element on said implement structure, a depth gauge element connected to the implement adapted to be adjusted with respect thereto, a hydraulic device including a cylinder member and a piston member, one of said members being connected to the gauge element and the other member being connected to the implement structure, whereby reciprocation of the piston in the cylinder adjusts the working depth of the soil working element, a second hydraulic device including a cylinder member and a piston member, a releasable connection between one of said members and the power lift element, a second releasable connection between the other member and the tractor, said cylinder and piston devices being of the two-way acting type, a fluid conduit connecting the two cylinders on opposite sides of the pistons, whereby movement of one piston transmits movement to the other piston, and means connected to one of the releasable connections of the second hydraulic device operable to disconnect said release means upon release of the hitch mechanism with subsequent relative movement of the tractor with respect to the implement structure.

9. A tractor attached implement comprising, in combination with a tractor having a draw-bar structure and two independent operator-controlled swingable power-lift arms, an implement structure secured to said draw-bar structure by a releasable hitch mechanism, an implement member on said implement structure adapted to be adjusted for controlling its functioning, a hydraulic device mounted on the implement and connected to said member, a hydraulic device mounted on the tractor and connected to one of said power-lift arms, a flexible fluid pressure transmitting conduit connecting said power-lift devices, means for releasably connecting the power-lift device on the tractor to the tractor and to the power-lift arm, said means being operable after release of the hitch mechanism and subsequent movement of the implement structure relative to the tractor to free the power lift device from the tractor, and lifting means connecting the other power-lift arm to said implement for bodily lifting the same, said lifting means including means releasable by movement of the tractor longitudinally of the implement.

10. A tractor attached implement comprising, in combination with a tractor having a draw-bar structure and two independent operator-controlled swingable power-lift arms, an implement structure secured to said draw-bar structure by a releasable hitch mechanism, an implement member on said implement structure adapted to be adjusted for controlling its functioning, a two-way hydraulic device mounted on the implement and connected to said member, a two-way hydraulic device mounted on the tractor and connected to one of said power-lift arms, a pair of flexible fluid pressure transmitting conduits connecting said power-lift devices, means for releasably connecting the power-lift device on the tractor to the tractor and to the power-lift arm, said means being operable after release of the hitch mechanism and subsequent movement of the implement structure relative to the tractor to free the power lift device from the tractor, and lifting means connecting the other power-lift arm to said implement for bodily lifting the same, said lifting means including means releasable by movement of the tractor longitudinally of the implement.

11. A tractor attached implement comprising, in combination with a tractor having a draw-bar structure and an operator-controlled swingable power-lift arm, an implement structure secured to said draw-bar structure by a releasable hitch mechanism, said structure including a soil working element and an adjustable gauge wheel, a member on said implement structure connected to the gauge wheel and adapted to be adjusted for controlling the depth of operation of the soil working element, an expansible hydraulic device constructed to transmit positive force in either direction mounted on the implement and connected to said member, an expansible hydraulic device constructed to transmit positive force in either direction mounted on the tractor and connected to said power-lift arm, a pair of flexible conduits connecting said power-lift devices, and means for releasably connecting the power-lift device on the tractor to the tractor and to the power-lift arm, said means being operable after release of the hitch mechanism and subsequent movement of the implement structure relative to the tractor to actuate the releasable connections and to free the power lift device from the tractor.

12. A tractor attached implement comprising, in combination with a tractor having a draw-bar structure and two independent operator-controlled swingable power-lift arms, an implement structure secured to said draw-bar structure by an overload release hitch mechanism, said structure including a soil working element and an adjustable gauge wheel, a member on said implement structure connected to the gauge wheel and adapted to be adjusted for controlling the depth of operation of the soil working element, an expansible hydraulic device mounted on the implement and connected to said member, an expansible hydraulic device mounted on the tractor and connected to said power-lift arm, a flexible conduit connecting said power-lift devices, and means for releasably connecting the power-lift device on the tractor to the tractor and to the power-lift arm, said means being operable after release of the hitch mechanism and subsequent movement of the implement structure relative to the tractor to actuate the releasable connection and to free the power lift device from the tractor, and power-lift connections between the tractor and the implement and operatively connected to the other power-lift arm, said connection including a releasable means actuated by movement of the tractor forwardly relative to the implement.

13. A tractor attached implement comprising, in combination with a tractor having a draw-bar structure and two independent operator-controlled swingable power-lift arms, an implement structure secured to said draw-bar structure by an overload release hitch mechanism, said structure including a soil working element and an adjustable gauge wheel, a member on said implement structure connected to the gauge wheel and adapted to be adjusted for controlling the depth of operation of the soil working element, an expansible hydraulic device constructed to transmit positive force in either direction mounted on the implement and connected to said member, an expansible hydraulic device constructed to transmit positive force in either direction mounted on the tractor and connected to said power-lift arm, a pair of flexible conduits connecting said lower-lift devices, and means for releasably connecting the power-lift device on the tractor to the tractor and to the power-lift arm, said means being operable after release of the hitch mechanism and subsequent movement of the implement structure relative to the tractor to actuate the releasable connection and to free the power-lift connections between the tractor and the implement and operatively connected to the other power-lift arm, said connection including a releasable means actuated by movement of the tractor forwardly relative to the implement.

14. A tractor and implement combination comprising, in combination with a tractor having a power-lift device thereon, an implement structure secured to the tractor by an overload release mechanism, and vertically extending lifting connections between the power-lift device and the implement structure constructed and arranged to bodily lift the implement structure with respect to the tractor, said lifting connections including means automatically disconnectable following release of the hitch mechanism and movement of the implement structure relative to the tractor in a fore or aft direction.

15. A tractor and implement combination comprising, in combination with a tractor having a power-lift device thereon including a lifting arm extending rearwardly from the tractor, an implement structure detachably secured to the tractor in trailing relation therebehind, and vertically extending lifting connections between the lifting arm on the tractor and the implement structure constructed and arranged to bodily lift the implement structure with respect to the tractor, said lifting connections including a release means automatically disconnectable upon movement of the tractor relative to the implement structure in a fore or aft direction.

16. A tractor-attached implement comprising, in combination with a tractor having an operator-controlled power-shiftable element, an implement structure releasably secured to the tractor, a working member on said implement structure adapted to be adjusted with respect thereto, a flexible extensible power-actuable device including a cylinder member mounted on the tractor, a plunger reciprocable in the cylinder member and connected to the power shiftable element on the tractor, said device including a second cylinder member mounted on the implement, a second plunger member mounted for reciprocation in said second cylinder member and connected to the working member on the implement structure, and a flexible conduit connecting the cylinder member on the tractor with the cylinder member on the implement, said conduit providing means for confining a pressure-transmitting medium for transmitting power from the plunger member on the tractor to the plunger member on the implement, and means for releasably connecting the cylinder and piston members on the tractor, said means being operable by movement of the tractor relative to the implement structure to free the expansible device from the tractor.

17. A device as set forth in claim 16 in which the implement structure is secured to the tractor by an overload release mechanism.

18. A device as set forth in claim 16 in which the tractor is provided with a second independent operator-controlled swingable power-lift arm and in which lifting means are provided between said arm and the implement for bodily lifting the same, said lifting means including means releasable by movement of the tractor longitudinal of the implement.

RUSSEL D. ACTON.

REFERENCES CITED

The following references are of record in the file of this patent:

UNITED STATES PATENTS

| Number | Name | Date |
| --- | --- | --- |
| 2,283,377 | Lindgren et al. | May 19, 1942 |
| 2,292,961 | Mott | Aug. 11, 1942 |
| 2,319,492 | Dewey | May 18, 1943 |
| 1,931,815 | Conley | Oct. 24, 1933 |
| 2,232,506 | Acton | Feb. 18, 1941 |
| 2,368,266 | Silver | Jan. 30, 1945 |

FOREIGN PATENTS

| Number | Country | Date |
| --- | --- | --- |
| 108,038 | Australia | July 19, 1939 |

Certificate of Correction

Patent No. 2,430,696.                                         November 11, 1947.

RUSSEL D. ACTON

It is hereby certified that errors appear in the printed specification of the above numbered patent requiring correction as follows: Column 9, line 48, claim 13, for "lower-lift" read *power-lift*; column 10, line 22, claim 16, for "power-actuable" read *power-actuatable*; and that the said Letters Patent should be read with these corrections therein that the same may conform to the record of the case in the Patent Office.

Signed and sealed this 13th day of April, A. D. 1948.

[SEAL]

THOMAS F. MURPHY,
*Assistant Commissioner of Patents.*